(12) United States Patent  (10) Patent No.: US 6,695,394 B2
Takahashi  (45) Date of Patent: Feb. 24, 2004

(54) REAR VEHICLE BODY STRUCTURE FOR PICKUP TRUCKS

(75) Inventor: Yasushi Takahashi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/330,707

(22) Filed: Dec. 27, 2002

(65) Prior Publication Data
US 2003/0122402 A1 Jul. 3, 2003

(30) Foreign Application Priority Data
Dec. 28, 2001 (JP) ....................... 2001-400215

(51) Int. Cl.⁷ .............................. B62D 21/03; B60J 5/10
(52) U.S. Cl. ............... 296/190.11; 296/183; 296/26.11; 296/204; 296/193.07
(58) Field of Search ................... 296/190.11, 26.08, 296/26.11, 50, 146.8, 147, 106, 183, 204, 203.03, 193.08, 193.07, 57.1, 146.9, 191

(56) References Cited

U.S. PATENT DOCUMENTS

| | | | |
|---|---|---|---|
| 5,524,951 A | * | 6/1996 | Johnson ..................... 296/37.6 |
| 6,416,104 B1 | * | 7/2002 | Fisher et al. ............. 296/37.16 |
| 6,450,566 B1 | * | 9/2002 | Hong ..................... 296/190.11 |
| 6,481,772 B1 | * | 11/2002 | Tenn ........................ 296/26.11 |
| 6,505,872 B2 | * | 1/2003 | Hong ..................... 296/26.11 |
| 6,575,515 B2 | * | 6/2003 | Hashimoto et al. ...... 296/26.11 |
| 2003/0122401 A1 | * | 7/2003 | Hashimoto ............. 296/190.11 |

* cited by examiner

Primary Examiner—D. Glenn Dayoan
Assistant Examiner—Greg Blankenship
(74) Attorney, Agent, or Firm—Darby & Darby

(57) ABSTRACT

The pickup truck has a back panel separating the passenger compartment and cargo bed, connected to the rear floor panel of the vehicle and formed with an opening which is opened and closed by a hinged panel. A lower back panel constitutes the lower end of the back panel and defines the bottom edge of the opening. The lower back panel has a forward flange and a backward flange extending a certain distance from its front and rear ends. The flanges are connected to the rear floor panel such that the lower back panel and the rear floor panel together form a closed space therein. Thereby, the rigidity of the lower back panel, in particular, the bottom edge of the opening in the back panel where a cargo tray is mounted is increased, so that deformation of the lower back panel due to heavy cargo load can be prevented. The front circumferential edge of the forward flange is bent upward, and drain parts which extend through the rear floor panel are formed at predetermined positions in the forward flange. The structure thus ensures that rain water entering the passenger compartment can be swiftly drained to the outside of the vehicle.

8 Claims, 8 Drawing Sheets

REAR VEHICLE BODY STRUCTURE FOR PICKUP TRUCKS

BACKGROUND OF THE INVENTION

The present invention relates to a rear vehicle body structure for pickup trucks, in particular, to the rear vehicle body structure for pickup trucks having a structure for the back panel which separates the passenger compartment and cargo bed and includes an opening with a hinged opening and closing panel.

The present application claims priority from Japanese Patent Application No. 2001-400215, the disclosure of which is incorporated herein by reference for all purposes.

In response to the diversifying needs of consumers, car manufacturers have produced more and more car-based pickup trucks and car- or truck-based sport utility vehicles (SUVs) in recent years, as these vehicles offer both the practicality of trucks with a high cargo capacity and the comfortability of passenger cars. Some of these pickup trucks are provided with an opening with the hinged opening and closing panel in the lower part of their back panel which separates the passenger compartment from a cargo bed. Whenever it is necessary, the rear seats are folded down, and the opening and closing panel is pushed either forward or backward to open the opening, so that more space can be used for loading cargo.

The pickup trucks have a monocoque vehicle body similar to that of cars unlike recreational vehicles (RVs) which have a frame structure. Therefore, if the back panel separating the passenger compartment and the cargo bed has an opening in its lower part, the lower end of the back panel will have a decreased rigidity. If the lower end of the back panel is not sufficiently rigid, the bottom edge of the opening in the back panel cannot stand heavy cargo load and may deform. Since the bottom edge of the opening is often used for holding a mounting end of a cargo tray which is placed over the cargo bed floor, it needs to have sufficient strength to support the cargo load.

Another problem is that the back panel with an opening therein requires a structure which prevents rain water from entering inside the truck. Normally, a weather strip is fitted to an entire circumferential edge of the opening, so that, when the opening and closing panel is closed, the weather strip fits in tightly between the opening and closing panel and the back panel by elastic deformation and seals a gap thereof, preventing rain water from entering the passenger compartment and insulating noise. However, if the opening and closing panel is opened during it is raining, water runs into the passenger compartment through the opening. If the opening and closing panel is designed to be pushed down forward, i.e., toward the passenger compartment, water gathered in the weather strip may also flow into the compartment when the opening and closing panel is opened.

SUMMARY OF THE INVENTION

The present invention has been devised to resolve the problems encountered by the conventional rear vehicle body structure for pickup trucks. An object of the present invention is to provide a rear vehicle body structure for pickup trucks, with which rigidity of the lower end of the back panel, in particular, the bottom edge of the opening where a cargo tray is mounted, is increased so as to prevent deformation of the lower end of the back panel due to heavy cargo load, and with which rain water entering into the passenger compartment is swiftly drained to the outside of the pickup trucks.

To achieve the above object, the rear vehicle body structure of the pickup truck has the passenger compartment, a cargo bed, and a back panel separating the passenger compartment and the cargo bed, the back panel including an opening formed therein which is opened and closed by an opening and closing panel. According to the first aspect of the present invention, the rear vehicle body structure includes a lower back panel constituting a lower end of the back panel and defining a bottom edge of the opening in the back panel, a forward flange extending a predetermined distance from a front end portion of the lower back panel, a front circumferential edge portion of the forward flange being bent upward, a backward flange extending a predetermined distance from a rear end portion of the lower back panel, and a rear floor panel connected to the forward flange and the backward flange of the lower back panel, whereby the lower back panel and the rear floor panel form a closed space together.

According to the second aspect of the invention, the rear vehicle body structure according to the first aspect may further include a drain part formed at a predetermined position in the forward flange so as to extend through the rear floor panel.

According to the third aspect of the invention, the rear vehicle body structure according to the first or second aspect may further include a cross member extending in a widthwise direction of the pickup truck on a lower face of the rear floor panel where the lower back panel is connected to an opposite face thereof, such that the cross member and the rear floor panel form a closed space together.

According to the fourth aspect of the invention, in the rear vehicle body structure according to any of the first to third aspects the lower back panel may be made up of a front lower back panel and a rear lower back panel separated in front to rear direction of the pickup truck, where the front lower back panel may be further separated into an upper part and a lower part. One of the above mentioned structures may be formed with a beaded surface so that the upper part and the lower part are connected together via the beaded surface.

According to the fifth aspect of the present invention, in the rear vehicle body structure according to the fourth aspect, a side end portion of the lower part of the front lower back panel may be connected to the rear lower back panel, whereby the closed space defined by the lower back panel and the rear floor panel is divided into an upper section and a lower section.

According to the sixth aspect of the invention, in the rear vehicle body structure according to any of the first to fifth aspects, the rear floor panel may be beaded along front to rear direction of the pickup truck at a portion where the forward flange of the lower back panel is connected thereto.

According to the seventh aspect of the invention, in the rear vehicle body structure according to any of the first and the third to sixth aspects, a part of the front circumferential edge portion of the forward flange may be bent downward, and a drain part may be formed in the rear floor panel below the bent portion of the forward flange so as to extend through the rear floor panel.

According to the eighth aspect of the invention, in the rear vehicle body structure according to any of the second to seventh aspects, the drain part may further include a one-way plug fitted therein.

BRIEF DESCRIPTION OF THE DRAWINGS

These and other objects and advantages of the present invention will become clearly understood from the following description with reference to the accompanying drawings, wherein.

DESCRIPTION OF THE PREFERRED EMBODIMENTS

Figure 1:
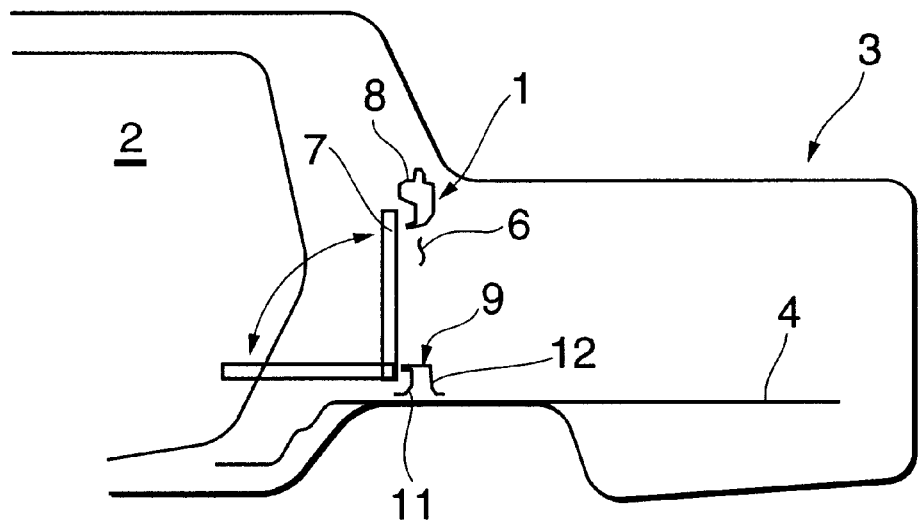
FIG. 1 is a side sectional view illustrating a rear vehicle body structure of a pickup truck to which the present invention is applied.
Figure 1:
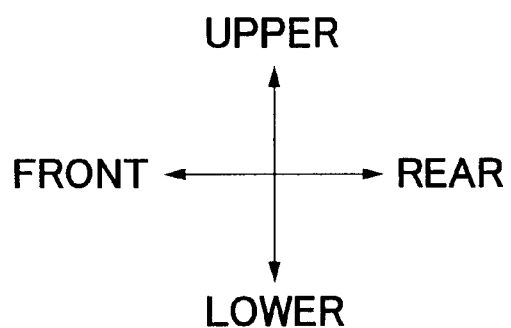
Figure 2:
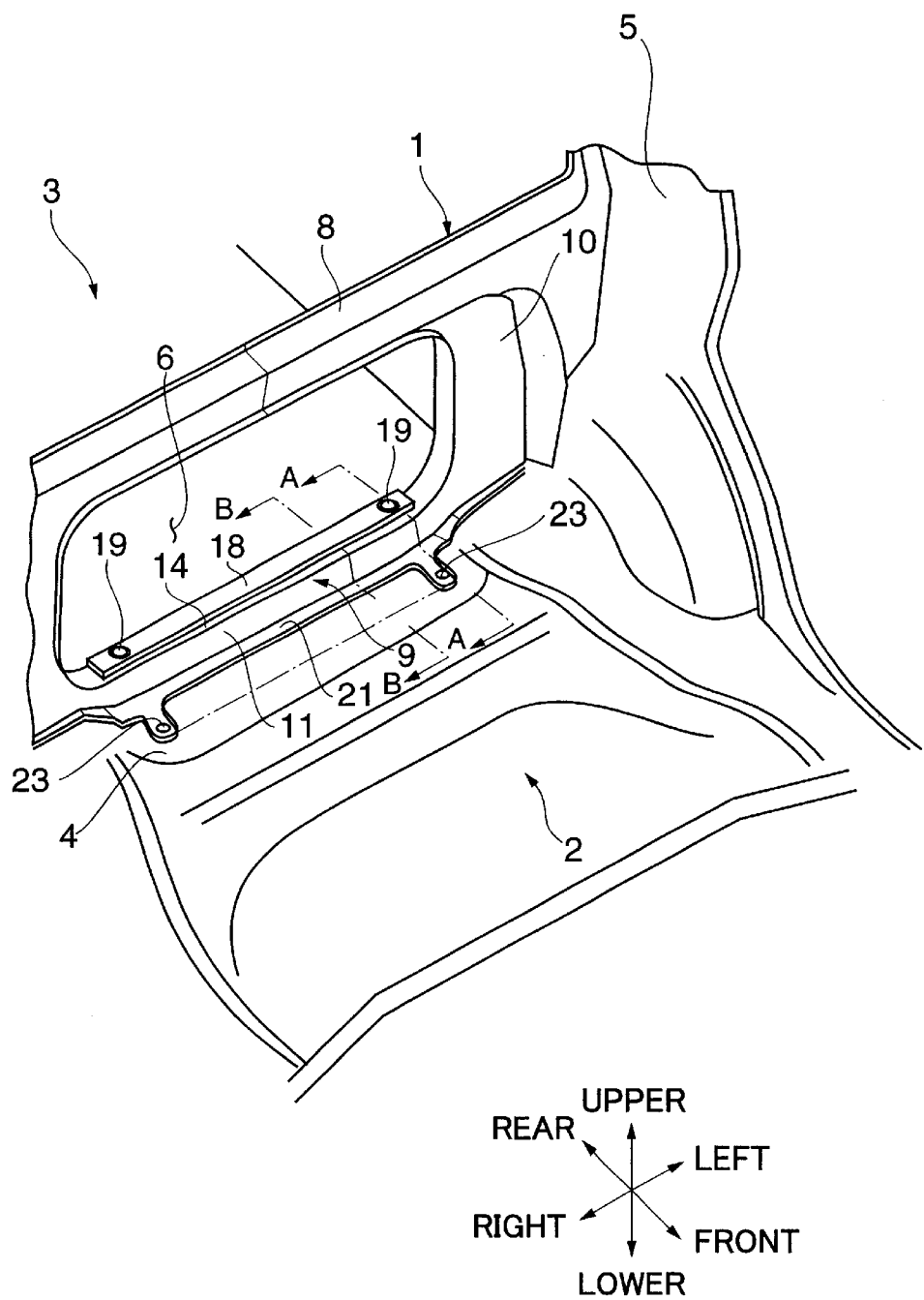
FIG. 2 is a perspective view illustrating essential parts of the rear vehicle body structure.
Figure 3:
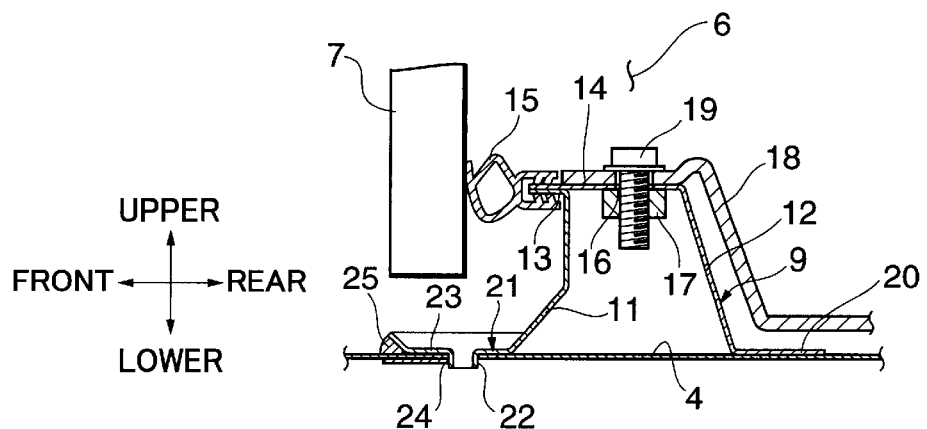
FIG. 3 is a cross-sectional view taken along the line A—A of FIG. 2 in the direction of the arrows, illustrating the essential parts of the rear vehicle body structure.

Preferred embodiments of a rear vehicle body structure for pickup trucks according to the present invention will be hereinafter described with reference to the accompanying drawings. FIGS. 1 to 3 illustrate the first embodiment of the present invention. FIG. 1 is a side sectional view illustrating the rear vehicle body structure of a pickup truck to which the present invention is applied. FIG. 2 is a perspective view illustrating essential parts of the rear vehicle body structure. FIG. 3 is a cross-sectional view taken along the line A—A of FIG. 2 in the direction of the arrows, illustrating the essential parts of the rear vehicle body structure.

As can be seen from FIGS. 1 to 3, a back panel 1 is a partition member for separating a passenger compartment 2 and a cargo bed 3 of a car-based pickup truck having a monocoque structure. A lower end portion of the back panel 1 extending in widthwise direction of the vehicle body is fixedly jointed to and along a front end portion of a rear floor panel 4. Both left and right side edges of the back panel 1 are fixedly jointed to left and right side walls 5 of the vehicle body.

A foldable rear seat (not shown) is provided on the front side of the back panel 1, i.e., on the side of the passenger compartment 2. A rectangular opening 6 communicating the passenger compartment 2 and the cargo bed 3 is formed in a lower portion of the back panel 1 just behind the seat back of these rear seats. On the front side of the opening 6 is mounted an opening and closing panel 7 which is rotatably supported around a hinge (not shown) so that the opening 6 is closed when the panel 7 stands upright and opens the same when it is turned down toward the side of the passenger compartment 2 as shown in FIG. 1.

The opening 6 is defined by a center back panel 8, a lower back panel 9, and a pair of rear bulk heads 10. That is, the center back panel 8 and the lower back panel 9 extending along the widthwise direction of the vehicle body are spaced apart from each other in vertical direction and their both side edges are firmly connected to the pair of rear bulk heads 10 by welding, so as to form the opening 6 in the back panel 1.

The lower back panel 9, which defines the bottom edge of the opening 6 and forms the lower end portion of the back panel 1, will be described below in some more detail.

The lower back panel 9 is made up of a front lower back panel 11 and a rear lower back panel 12 extending along the widthwise direction of the vehicle body. Both the panels 11 and 12 have a flange protruding from their upper ends toward the front side, and these forward flanges 13 and 14 are superposed upon one another and welded together. Thus, a cross section of the lower back panel 9 has a hat-like shape with a bottom wider than that of an upper portion thereof. The tips of the forward flanges 13 and 14 at the upper end of the lower back panel 9 is fitted with a weather strip 15 which tightly contacts with the opening and closing panel 7 in its closed position as shown in FIG. 3, so as to prevent rain water from running into the passenger compartment 2.

A plurality of bolt holes 16 (two in this embodiment) of a predetermined diameter are formed at certain positions in the upper end of the lower back panel 9, i.e., in the flange 14 of its rear lower back panel 12. Respective welded nuts 17 are provided on the lower side of the bolt holes 16. Mounting bolts 19 for fixing a front end portion of a cargo tray 18 which covers the rear floor panel 4 from above are passed through the holes 16 and screwed into the welded nuts 17. The rear lower back panel 12 which constitutes a lower rear end portion of the lower back panel 9 is further formed with a backward flange 20 by bending the lower edge of the rear lower back panel 12 toward the rear side.

The front lower back panel 11 which constitutes a lower front end portion of the lower back panel 9 has a forward flange 21 extending along the widthwise direction of the vehicle body and protruding a certain distance in a forward direction. The front circumferential edge of the forward flange 21 is bent upward or obliquely forward and upward. The forward flange 21 is slightly inclined in a widthwise direction of the vehicle body and formed with a drain part 23 at a predetermined position, e.g., at either end thereof. The drain parts 23 are formed to extend from the forward flange 21 in the form of a tray (when viewed from above) and are integrally formed with downward drain passages 22 each having a tubular shape in the respective central portions. The drain parts 23 are positioned below the weather strip 15 when the lower back panel 9 is connected to a predetermined position of the rear floor panel 4.

In the rear floor panel 4 to which the lower face of the forward flange 21 of the lower back panel 9 is connected, through holes 24 are formed at predetermined positions through which the drain passages 22 of the drain parts 23 pass downward to discharge rain water to the outside. Thus, the lower faces of the forward flange 21 and the backward flange 20 of the lower back panel 9 are fixedly connected to the upper face of the rear floor panel 4 by welding, while the drain passages 22 of the drain parts 23 are allowed to pass through the through holes 24 in the rear floor panel 4. Accordingly, the lower end of the opening 6, or the lower end portion of the back panel 1 has a hollow square cross section defined by the rear floor panel 4 and the lower back panel 9. This structure increases the rigidity in a lateral direction of the lower end of the back panel 1. The gap between the rear floor panel 4 and the front end of the lower back panel 9 is filled with a body sealant 25 so as to enhance an anti-corrosive property.

As described above, according to the present invention, the pickup truck having a monocoque structure includes the back panel 1 for separating the passenger compartment 2 and the cargo bed 3, and the back panel 1 is formed with the opening 6 just behind the seat back of the rear seats with an opening and closing panel 7 on its front side for opening and closing the opening 6. The lower end portion of the back panel 1 below the opening 6 is made up of the lower back panel 9 connected to the rear floor panel 4 by welding. The lower back panel 9 consists of the front lower back panel 11 and the rear lower back panel 12 and has a hat-shaped cross section. The front circumferential edge of the forward flange 21 of the lower back panel 9 is bent upward or obliquely forward and upward, and is formed with tray-like drain parts 23 with drain passages 22 in the respective central portions. The lower part of the back panel 1 below the opening 6 is strengthened by the structures and therefore, the lower end portion of the back panel 1 will hardly deform even if the heavy cargo is loaded upon the cargo tray 18 mounted on the bottom edge of the back panel 1.

When the opening and closing panel 7 is opened, the rain water may run into the passenger compartment 2 from between the opening and closing panel 7 and the weather strip 15 through the outer surfaces of the front lower back panel 11, but it is stopped by the forward flange 21, collected into the drain parts 23 along the slopes and swiftly discharged through the drain passages 22 to the outside of the vehicle. Therefore, erosion by the water of the rear floor panel 4 is much reduced, and the passenger compartment 2 is prevented from becoming unclean. Also, the anti-corrosive property of the welded portion between the back panel 1 and the rear floor panel 4 on the side of the passenger compartment 2 is improved, whereby the necessity of the sealant 25 is much decreased, leading to reduce a production cost.

The front edge of the forward flange 21 may entirely extend as far as the tips of the drain parts 23 as shown by a dotted line in FIG. 2. Thereby the forward flange 21 can stop and collect not only the rain water running through the outer surface of the front lower back panel 11 but also the rain water which drops from the slit between the opening and closing panel 7 and the weather strip 15.

Figure 4:
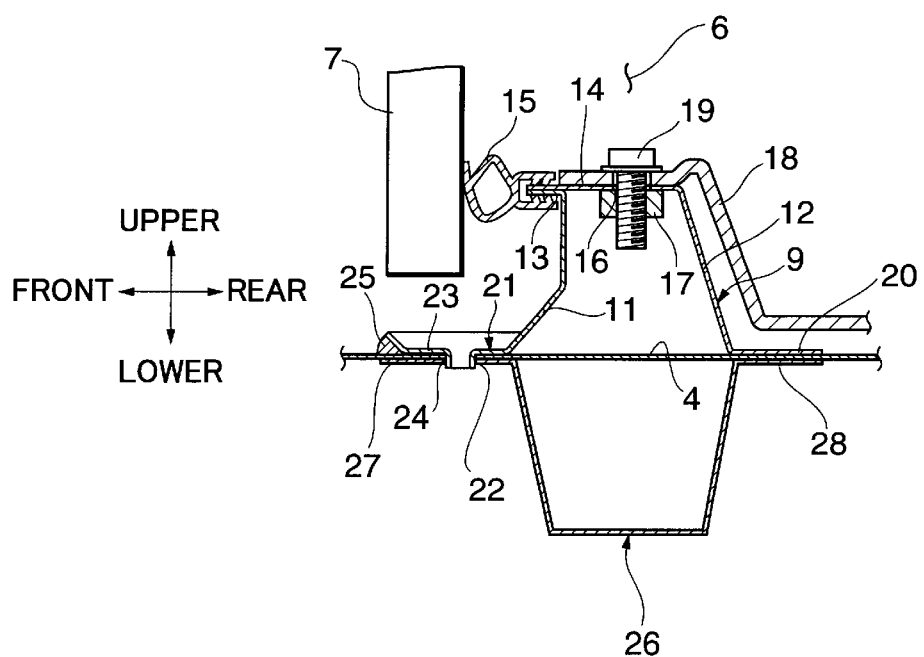
FIG. 4 is a side sectional view of the second embodiment of the present invention.

FIG. 4 illustrates the second embodiment of the invention, in which, in addition to the rear vehicle body structure of the first embodiment described above, a cross member 26 having an inverse hat-shaped cross section and extending in the widthwise direction of the vehicle body is connected to the lower face of the rear floor panel 4 on which the lower back panel 9 is provided. The cross member 26 is oriented so that its open end faces upward opposite to the lower back panel 9.

The cross member 26 of the second embodiment has a forward flange 27 and a backward flange 28 extending outwardly from its both front and rear ends, and these flanges 27 and 28 are overlaid upon the forward and backward flanges 21 and 20 of the lower back panel 9 via the rear floor panel 4 and connected thereto by welding.

Thus, according to the second embodiment, the rear vehicle body structure includes both the lower back panel 9 and the cross member 26 on upper and lower faces of the rear floor panel 4, which both have hollow rectangular cross sections. Therefore, in addition to the effects achieved by the structure of the first embodiment, the rigidity of the lower end portion of the back panel 1 below the opening 6 is further increased particularly in lateral direction. Also, with this structure, a rigidity against bending of the cross member 26 can be increased. The structure thus improves the lateral, longitudinal, and torsional rigidities around the rear end of the passenger compartment 2 without unnecessarily increasing the rigidity of the vehicle body in front to rear direction, and therefore it does not impede the buckling of the cargo bed 3 in the event of a rear impact collision, while protecting the passenger compartment 2 from deforming.

Figure 5:
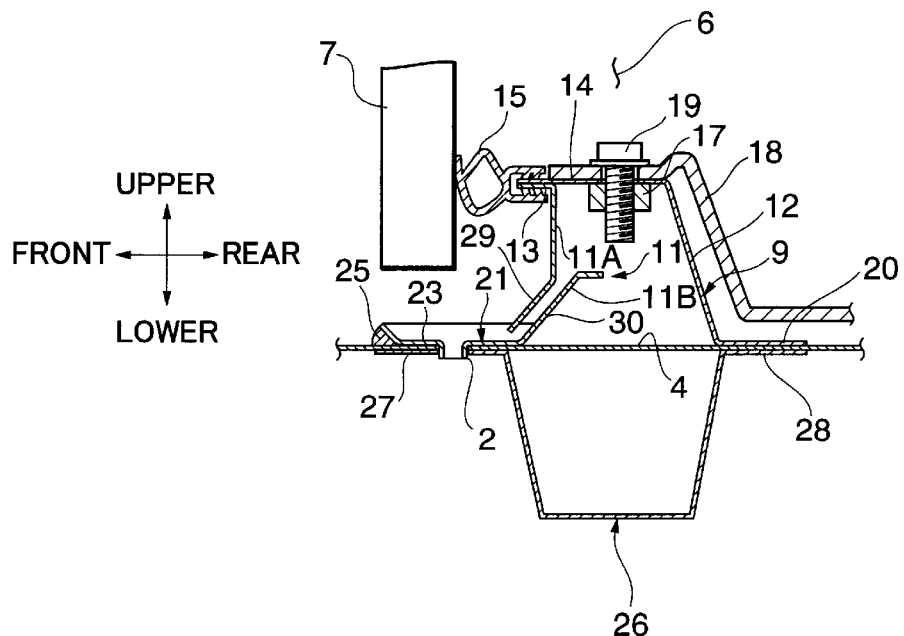
FIG. 5(a) is a side sectional view of the third embodiment of the present invention, taken along the same line as the line A—A of FIG. 2.
FIG. 5(b) is a side sectional view taken along the same line as the line B—B of FIG. 2.
Figure 5:
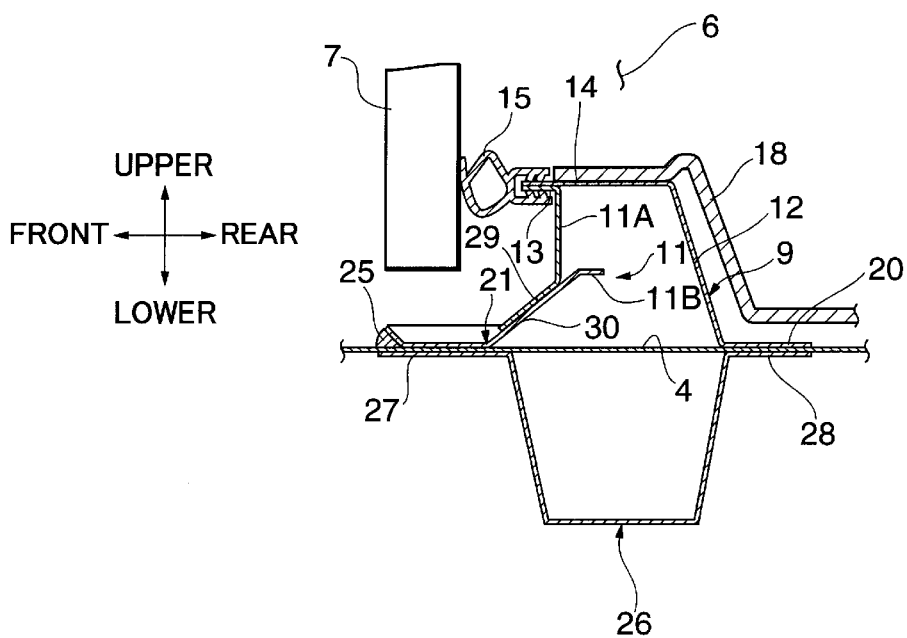

FIGS. 5(a) and 5(b) illustrate the third embodiment of the invention, in which, in addition to the structure of the second embodiment described above, the front lower back panel 11 is divided into two parts.

The front lower back panel 11 of the third embodiment is made up of an upper part 11A disposed on the upper side and a lower part 11B on the lower side. The upper part 11A is bent forward at its top end to form a flange 13, from which it extends downward and then is bent obliquely forward and downward to form an oblique bent portion 29 at its bottom end. The bent portion 29 of the upper part 11A is not connected to a forward flange 21 formed in the lower part 11B.

The lower part 11B is bent forward at its bottom end to form the flange 21, from which it extends obliquely upward to form a bent portion 30. The bent portion 30 of the lower part 11B is provided with a beaded surface such as bosses and cavities or corrugation. As shown in FIG. 5(b), which is a side sectional view taken along the same line as the line B—B of FIG. 2, the bent portion 30 of the lower part 11B is connected to the backside of the bent portion 29 of the upper part 11A by welding, so that there is a certain gap formed therebetween due to the bosses or ridges protruded forward on the bent portion 30.

The top end of the bent portion 30 is bent backward at a position above the bent portion 29 of the upper part 11A.

According to the third embodiment, in addition to the effects achieved by the structure of the second embodiment, even if rain water should leak into inside of the lower back panel 9 through the welded portion between the forward flanges 13 and 14 despite the weather strip 15, such water can be collected through the gap between the backside of the bent portion 29 of the upper part 11A and the cavities or grooves in the bent portion 30 of the lower part 11B and drained onto the forward flange 21. Accordingly, there will be no pool of rain water inside the hollow space defined by the rear floor panel 4 and the lower back panel 9, whereby the anti-corrosive property of the back panel 1 is much improved.

Figure 6:
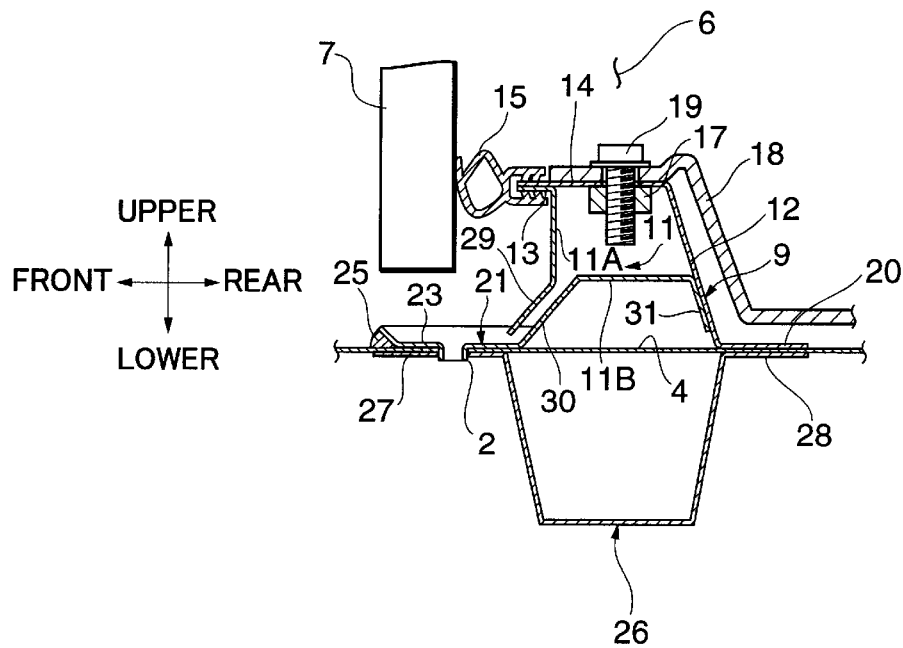
FIG. 6(a) is a side sectional view of the fourth embodiment of the present invention, taken along the same line as the line A—A of FIG. 2.
FIG. 6(b) is a side sectional view taken along the same line as the line B—B of FIG. 2.
Figure 6:
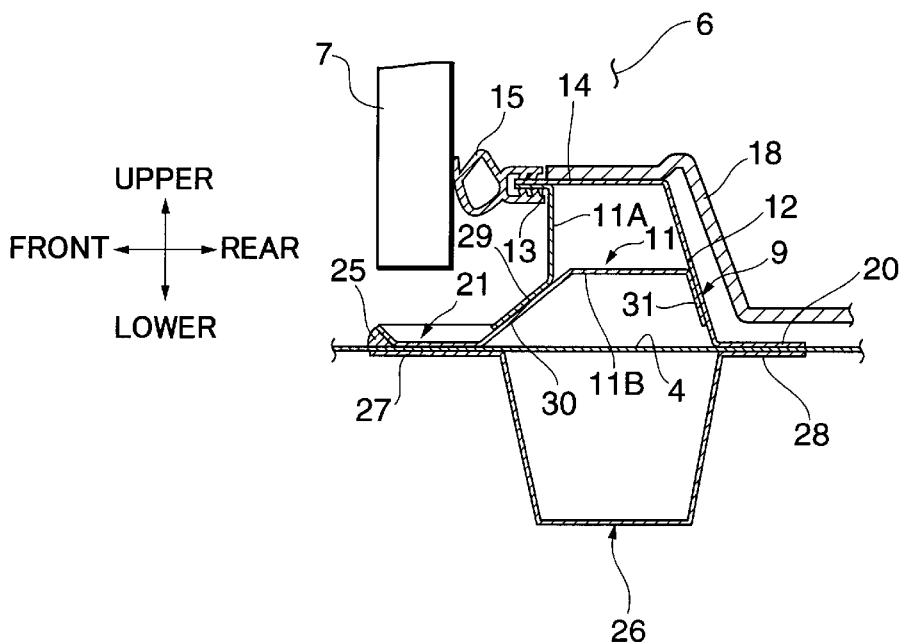

FIGS. 6(a) and 6(b) illustrate the fourth embodiment of the invention, in which, in addition to the structure of the third embodiment described above, the hollow rectangular cross section defined by the rear floor panel 4 and the lower back panel 9 is further divided into two sections.

More specifically, the rear or top end of the lower part 11B, which is bent backward, further extends backward of the vehicle body to the inner side face of the rear lower back panel 12, and is connected thereto. The connected end portion continues downward along the inner side face of the rear lower back panel 12 to form a conection face 31. The bottom end of the connection face 31 is not connected to the rear floor panel 4. The connection face 31 of the lower part 11B and the rear lower back panel 12 are connected together by welding.

Thus, according to the fourth embodiment, the hollow rectangular cross section defined by the rear floor panel 4 and the lower back panel 9 is divided into upper and lower rectangular sections. Therefore, in addition to the effects achieved by the structure of the third embodiment; the lateral, longitudinal, and torsional rigidities of the lower part of the back panel 1 where the opening 6 is formed is further improved, and the strength around the rear end of the passenger compartment 2 is also increased. Therefore, in the event of a rear impact collision, the passenger compartment 2 is firmly protected from deforming.

Figure 7:
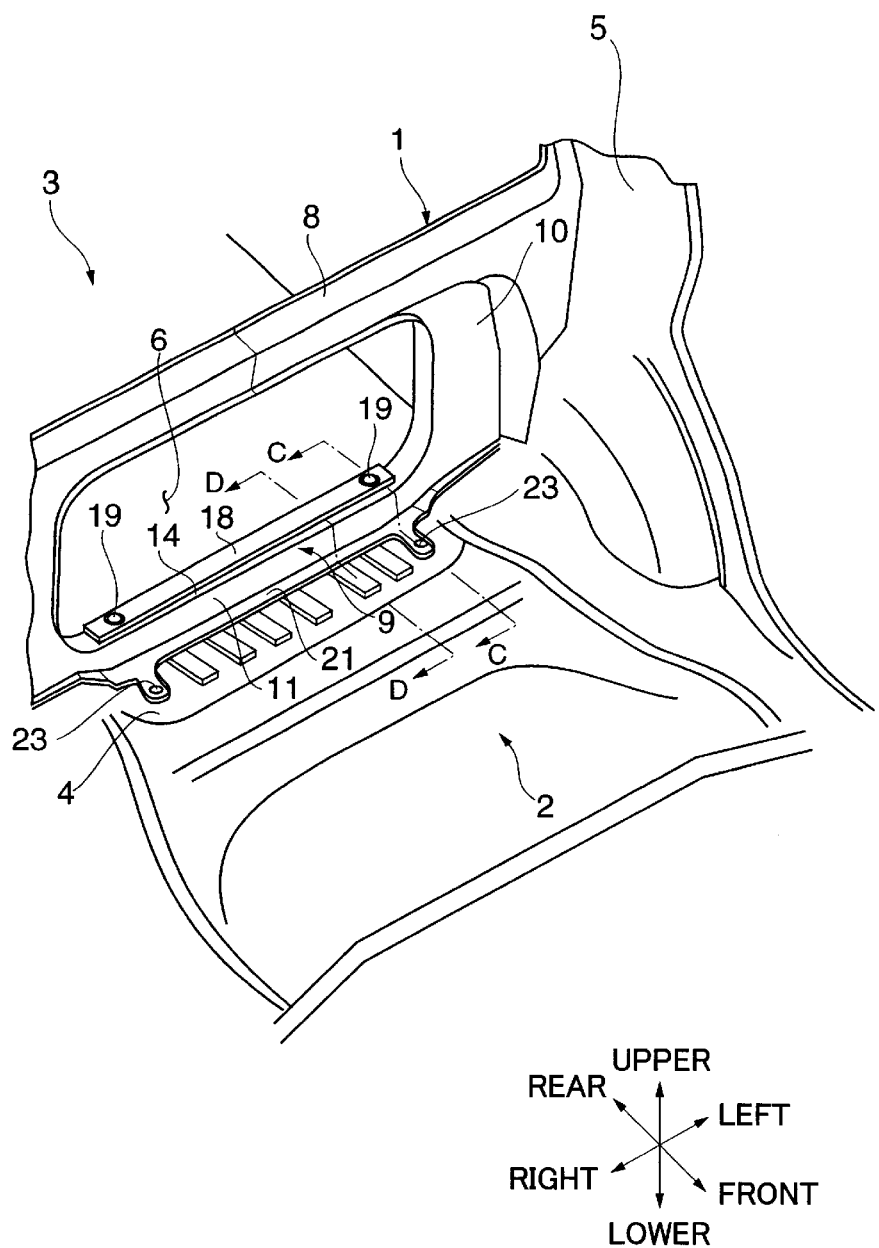
FIG. 7 is a perspective view of the fifth embodiment of the invention.
Figure 8:
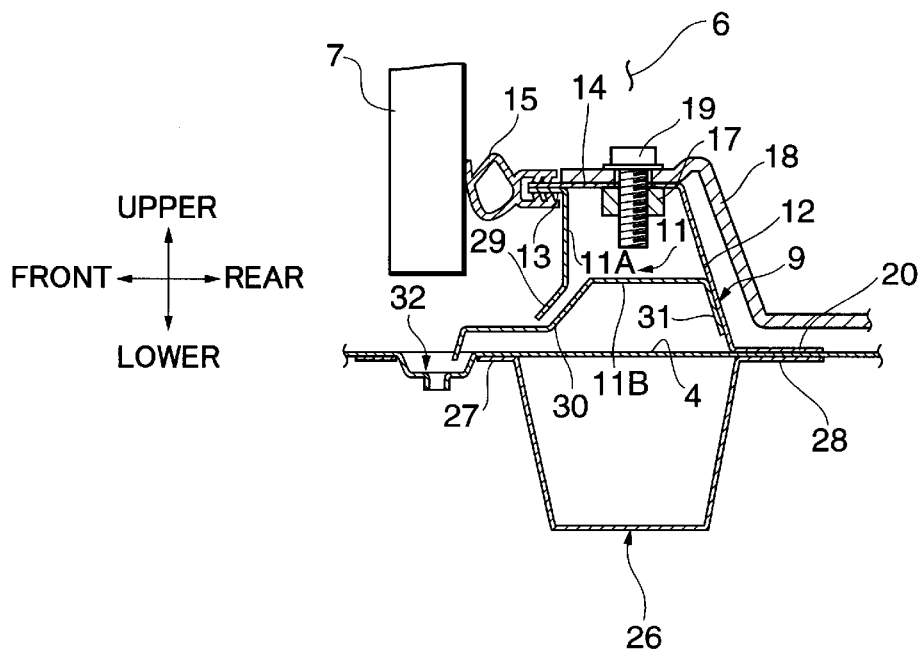
FIG. 8(a) is a side sectional view taken along the line C—C of FIG. 7.
FIG. 8(b) is a side sectional view taken along the line D—D of FIG. 7.
Figure 8:
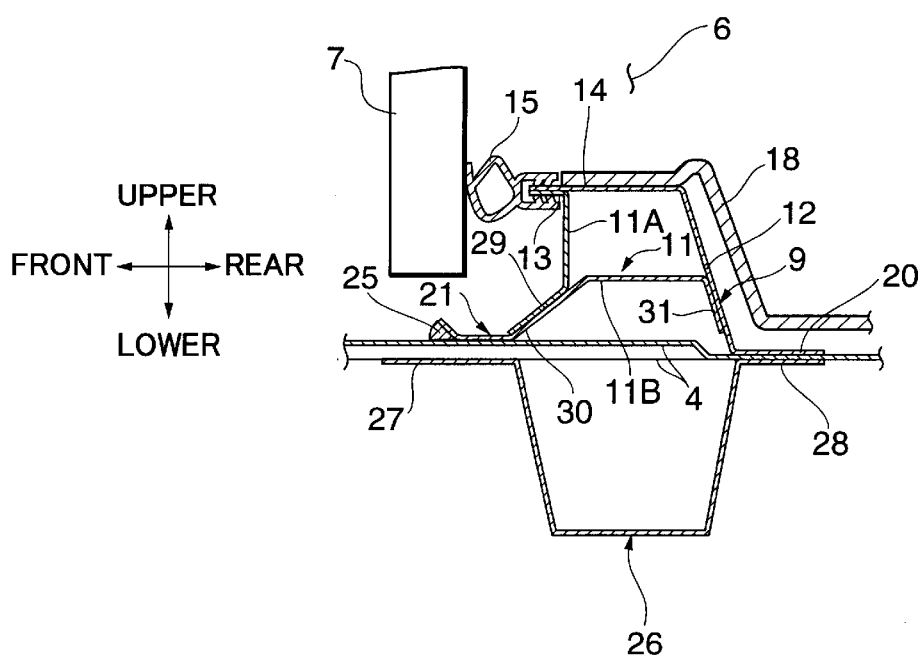

FIGS. 7, 8(a), and 8(b) illustrate the fifth embodiment of the invention in which, in addition to the structure of the fourth embodiment described above, the rear floor panel 4 to which the lower part 11B of the lower back panel 9 is connected is provided with a beaded surface such as bosses and cavities or corrugation.

As shown in FIGS. 7, 8(a), and 8(b), the lower face of the forward flange 21 of the lower part 11B is connected onto the rear floor panel 4. The rear floor panel 4 has the bead like the bosses and cavities or corrugation which extend from inside of the hollow space of the lower back panel 9 toward the front of the vehicle body. At predetermined positions in the rear floor panel 4 are formed floor drain parts 32 as shown in FIG. 8(a) instead of the drain parts 23 formed in the forward flange 21 of the lower part 11B, having hollow surfaces similarly to the drain parts 23. These floor drain parts 32 are provided at positions where cavities or grooves are formed in the rear floor panel 4. Part of the front end of the forward flange 21 of the lower part 11B is bent toward into the floor drain parts 32. Therefore, even if rain water should leak into inside of the lower back panel 9 through the welded portion between the forward flanges 13 and 14, such water can be collected through the gap between the backside of the bent portion 29 of the upper part 11A and the cavities or grooves in the bent portion 30 of the lower part 11B and drained onto the forward flange 21 and into the floor drain parts 32.

The top of the bosses or ridges formed in the beaded rear floor panel 4 are connected to the lower face of the forward flange 21 of the lower part 11B by welding as shown in FIG. 8(b).

According to the fifth embodiment, the rear floor panel 4 is formed with a beaded surface such as bosses/ridges and cavities or grooves extending toward the passenger compartment 2, and therefore, in addition to the effects achieved by the structure of the fourth embodiment, the lateral, longitudinal, and torsional rigidities of the lower end portion of the back panel 1 below the opening 6 is increased without adding any major change in the vehicle body design. The strength around the rear end of the passenger compartment 2 is further increased, whereby necessary rigidity of the vehicle body can be secured at a lower cost.

Figure 9:
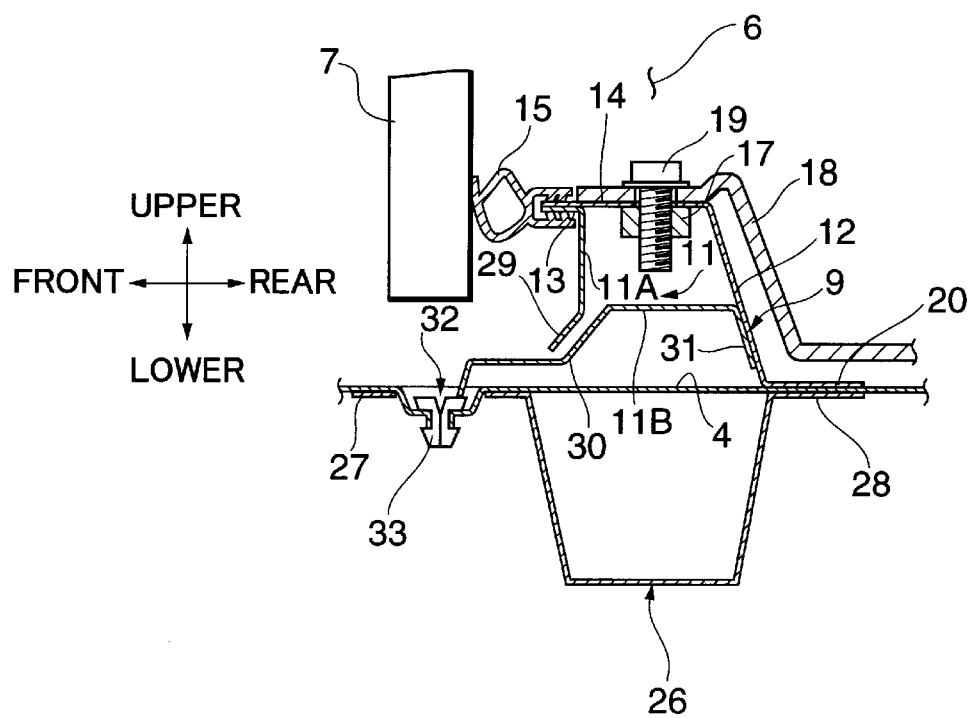
FIG. 9 is a side sectional view of the sixth embodiment of the present invention.

FIG. 9 illustrates the sixth embodiment of the invention, in which, in addition to the structure of the fifth embodiment described above, one-way plugs 33 are fitted in the floor drain parts 32 of the rear floor panel 4.

The floor drain parts 32 of the fifth embodiment are open all the time, and therefore during driving, water or dust blown by wind may easily enter the passenger compartment 2 through the floor drain parts 32. Noise may also be higher because of the open floor drain parts 32.

According to the sixth embodiment, one-way plugs 33 are fitted in the floor drain parts 32, so that rain water runs only in one, downward, direction. Not to mention, such one-way plugs of the sixth embodiment may also be applied advantageously to the drain parts 23 of the first to fourth embodiments as well as the fifth embodiment.

Therefore, with the structure of the sixth embodiment, in addition to the effects achieved by the structure of the fifth embodiment, the one-way plugs 33 fitted in the floor drain parts 32 can prevent rain water, dust, and noise from entering the passenger compartment 2.

As described above, the rear vehicle body structure for pickup trucks according to the present invention can improve the rigidity in the lower end portion of the back panel, in particular, the bottom edge of the opening in the back panel where a cargo tray is mounted, so that deformation of the lower end portion of the back panel due to heavy cargo load can be prevented. The structure also ensures that rain water which has entered the passenger compartment can be swiftly drained to the outside of the vehicle.

While there have been described what are at present considered to be preferred embodiments of the present invention, it will be understood that various modifications may be made thereto, and it is intended that the appended claims cover all such modifications as fall within the true spirit and scope of the invention.

What is claimed is:

1. A rear vehicle body structure of a pickup truck having a passenger compartment, a cargo bed, and a back panel for separating the passenger compartment and the cargo bed, the back panel including an opening formed therein, the opening being opened and closed by an opening and closing panel, comprising:

a lower back panel for constituting a lower end of said back panel and for defining a bottom edge of said opening in the back panel;

a forward flange extending a predetermined distance from a front end portion of the lower back panel, a front circumferential edge portion of the forward flange being bent upward;

a backward flange extending a predetermined distance from a rear end portion of the lower back panel; and a rear floor panel connected to said forward flange and said backward flange of the lower back panel, whereby said lower back panel and said rear floor panel form a closed cross-sectional space together.

2. The rear vehicle body structure according to claim 1, further comprising a drain part formed at a predetermined position in said forward flange so as to extend through said rear floor panel.

3. The rear vehicle body structure according to claim 1, further comprising:

a cross member extending in a widthwise direction of the pickup truck on a lower face of said rear floor panel where said lower back panel is connected to an opposite face thereof, whereby the cross member and the rear floor panel form a closed space together.

4. The rear vehicle body structure according to claim 1, wherein said lower back panel is made up of a front lower back panel and a rear lower back panel separated in front to rear direction of the pickup truck, said front lower back panel being further separated into an upper part and a lower part, one of said upper part and said lower part being formed with a beaded surface, and the upper part, the lower part being connected together via said beaded surface.

5. The rear vehicle body structure according to claim 4, wherein a side end portion of said lower part of said front lower back panel is connected to said rear lower back panel, whereby the closed space defined by the lower back panel and the rear floor panel is divided into an upper section and a lower section.

6. The rear vehicle body structure according to claim 1, wherein said rear floor panel is beaded along front to rear direction of the pickup truck at a portion where said forward flange of said lower back panel is connected thereto.

7. The rear vehicle body structure according to claim 1 wherein a part of the front circumferential edge portion of said forward flange is bent downward, and wherein a drain part is formed in said rear floor panel below said downwardly bent portion of the forward flange so as to extend through the rear floor panel.

8. The rear vehicle body structure according to claim 2, wherein a one-way plug is fitted in said drain part.

* * * * *